Sept. 16, 1941.   A. RONNING   2,256,219
POWER MOWING MACHINE
Filed May 26, 1938
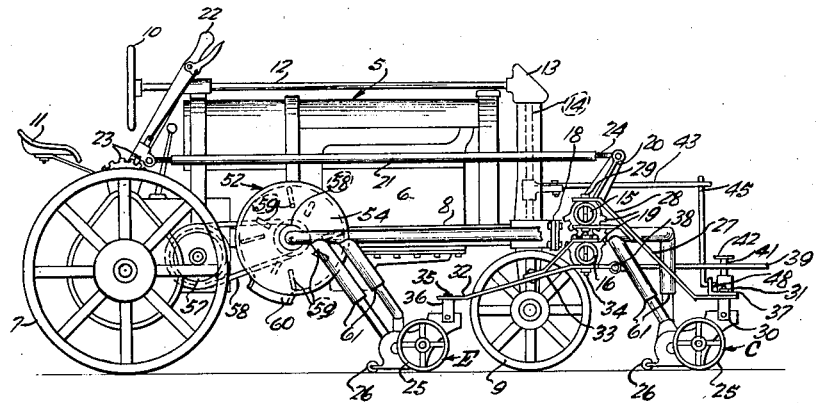
FIG-1-
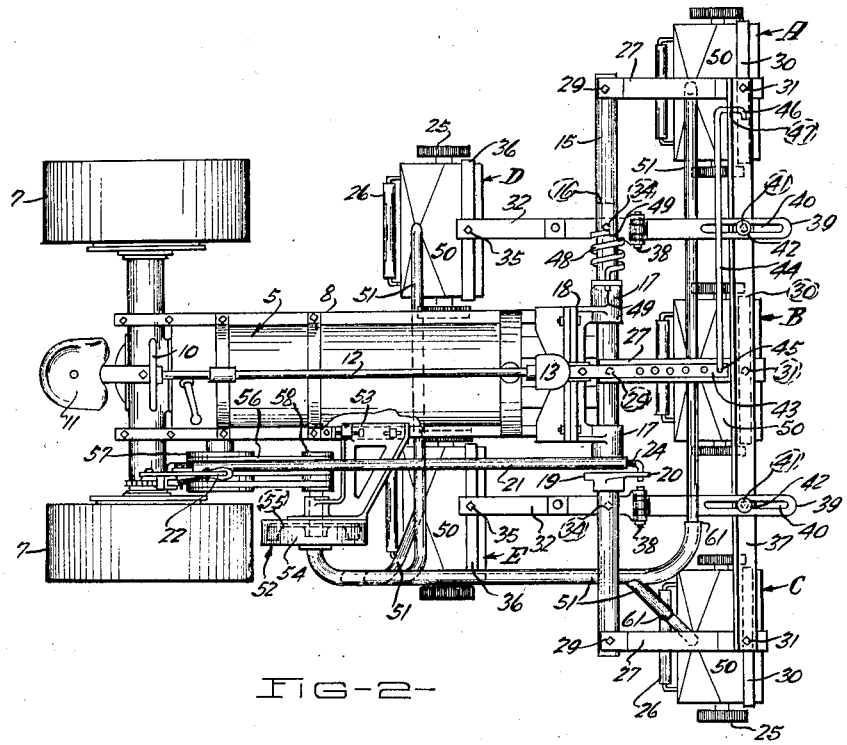
FIG-2-
INVENTOR
ADOLPH RONNING
BY
ATTORNEY Patented Sept. 16, 1941

2,256,219

UNITED STATES PATENT OFFICE 2,256,219

POWER MOWING MACHINE

Adolph Ronning, Minneapolis, Minn.

Application May 26, 1938, Serial No. 210,200

3 Claims. (Cl. 56—10)

This invention relates to improvements in power driven lawn mowers, and the primary object is to provide an efficient and practical form of power driven mower particularly suited for use upon large lawns, golf courses, parks, and the like.

Another, and highly important object of my invention, is to provide means, associated with the mowers and the tractor or propelling vehicle for the mowers, by which the grass cut by the mowers may be collected and cut into relatively small particles and finally discharged onto the ground. In this connection, it has been noted that the very fine particles of grass, when cut up as in accordance with my invention, may be discharged onto the cut lawn without in any way injuring the same. This is apparently due to the fact that these small particles will fall down around the grass blades onto the ground and will rapidly rot to actually fertilize the grass roots, whereas, the larger grass particles as cut by the mower, and without any further comminution, will not fall to the earth but will, instead, be upheld by the grass and will form a mat thereon which soon kills the grass. This effect is, of course, well known and heretofore the grass has been raked up or collected from the mower in order to prevent its falling onto the lawn, but this action requires time and labor, and actually is of disadvantage in that the cut blades will serve a useful purpose if finely cut and allowed to remain on the lawn.

Another object is to provide a mower assembly of this kind in which a plurality of individual mower units are arranged in connection with a traction vehicle such as a tractor, in order to be driven and carried thereby to cut a relatively wide swath in advance of the tractor so that the grass will not be pressed down below reach of the cutting elements of the mowers by the tractor wheels travelling over the lawn.

Another object is to provide a tractor mower assembly of this kind in which the mower units, while so supported that they will cut the grass in advance of the tractor wheels as described, are nevertheless arranged in a compact manner with a minimum amount of projection forwardly from the tractor. For this purpose, the mower units are arranged in two parallel, laterally extended gangs with the frontal units supported immediately ahead of the tractor and the rear units spaced at each side of the tractor but ahead of the traction wheels thereof. The frontal gang, therefore, includes a centrally located mower unit for cutting ahead of the narrow steering carriage of the tractor. The advantages of such an assembly are many, and include the ease and flexibility of the manipulation of such a compact assembly, and the simplification of the framework necessary to support the mowers.

Another object is to provide a tractor mower assembly of this kind in which the various mower units are wholly supported from a pair of transversely axised beams, with the frontal gang of mower units carried forwardly from a relatively long beam, and the rear units supported rearwardly from a shorter beam. These beams are supported in juxtaposition immediately ahead of the tractor, and are connected by gear segments in such manner that, by rocking one beam on its axis to raise one gang of mower units, the other beam will also be rocked on its axis, but in an opposite direction, to raise its supported gang of mower units.

Another object is to provide a tractor mower assembly in which the several mower units are all connected by a series of frame members, which also serve as the supporting means by which the units are carried from the beams aforesaid and which frame members are so connected to the steering mechanisms of the tractor that the mower units will be steered or guided in coordination with the steering of the tractor. By this arrangement the mower units are caused to properly shift their direction of travel as the tractor is steered to one side or the other, and a wide, even swath may be cut at all times.

The foregoing and other objects of my invention will be further disclosed in the course of the following detailed description, reference being had to the accompanying drawing, wherein:

Fig. 1 is a side elevation of my improved power mowing machine, showing the mower units as connected with a conventional type of tractor.

Fig. 2 is a plan view of the structure shown in Fig. 1.

It may here be noted that the present invention aims to provide improvements over my prior Patent No. 1,957,079, granted May 1, 1934, for Power driven mowing machine.

Referring now more particularly and by reference characters to the drawing, 5 designates a tractor of more or less conventional form embodying the power unit 6, the traction wheels 7, the frame 8, and dirigible wheeled forecarriage 9. This forecarriage 9 is steered by a hand wheel 10 located near the operator's seat 11, and the steering connection is made through a steering shaft 12 and beveled gears in the gear box 13, which drive the vertically axised shaft 14 to the lower end of which the forecarriage is connected.

In accordance with my invention, I provide a pair of tubular beams 15 and 16 which are journaled in bearing extensions 17 of a bracket casting 18 secured to the frontal part of the tractor frame 8. These beams are preferably, though not necessarily, arranged one immediately above the other as shown, and are extended transversely or crosswise with respect to the tractor 5 and its normal direction of travel. The uppermost beam 15 is hereinafter referred to as the supporting beam for the frontal mower gang, and the lowermost beam 16 is referred to as the supporting beam for the rear mower gang, and these beams serve as the primary mountings by which the mowers are supported from the tractor. Furthermore, these beams serve to raise and lower the front and rear mower gangs under the action of rotating the beams in the bearings 17. Inasmuch as the front mower gang is, of necessity, supported forwardly of the beam 15, and the rear mower gang is supported rearwardly of the beam 16, it is necessary that the beams be rotated or oscillated in opposite directions in order to raise the gangs. For this reason I provide each beam with a gear segment 19, which segments are placed in mesh as shown, and thus, by rocking the beam 15 in a counterclockwise direction, as viewed in Fig. 1, to raise the front mower gang, the beam 16 will be rotated in the opposite direction as required to raise the rear mower gang. The beams are thus moved in their bearings 17 by means of a lift assembly including an arm 20 which is extended radially and upwardly from the gear segment 19 of the upper beam 15, and which is connected by a rod 21 to a hand lever 22 mounted conveniently to the hand of an operator seated at 11. This lever is secured in any adjusted position by means of a conventional pawl, and notched quadrant assembly, indicated at 23, and the beams may thus, of course, be rocked to any desired position and secured thereat. An adjustment screw 24 at the frontal end of the rod 21 permits limited adjustment of the lifting mechanism.

The mowing units are designated generally at A, B, C, D, and E, and are, as stated, arranged in two gangs or rows extending transversely of the machine as a whole. The front gang comprises the three spaced units A, B, and C, and the rear gang comprises the units D and E which are so located and spaced as to cut swaths traversing the spaces between the front units. As a result a wide, even swath will be cut, of a width defined by the outermost units A and C. Each of the mowing units may be of the ordinary design, insofar as their actual cutting mechanism is concerned, and may be supported upon the lateral ground wheels 25 and rear rollers 26 as shown. The arrangement of the units, as shown, and with three units immediately ahead of the tractor and one rear unit at each side of the tractor, results in a compact assembly and aggroupment around the front end of the tractor which greatly facilitates maneuvering the machine.

The units A, B, and C are supported from the beam 15 by semi-resilient spring arms 27 having their rear ends forked, as at 28, to embrace the beam, to which they are attached by vertically axised diametrically extended pivot bolts 29. The mowing units are attached to the frontal ends of the arms 27 by bail members 30 which have pivotal connections at 31 with the arms, so that the mowing units will have a trailing or caster action when drawn over the ground, to thus assure proper cutting position with respect thereto. As the beam 15 is rocked on its axis, as hereinbefore described, the arm 27 will, of course, raise and lower the mowing units as may be desired. The arms 27 also serve to so support the mowing units that they will properly follow the contour of the ground, as will be understood.

The rear mowing units D and E are similarly supported by means of semi-resilient spring arms 32 which are forked at 33 to fit the lower beam 16, and to which they are pivotally secured by the vertically axised bolts 34. The arms 32 extend rearwardly from the beam 16, and at their rear ends are pivotally connected at 35 to bail members 36 secured to the mowing units, so that these units may also have a caster action upon the ground, but so that they may be raised and lowered by oscillating the beams 15 and 16.

A tie bar or steering bar 37 is extended transversely across the front gang of mowing units A, B, and C, and is pivotally connected to each unit by extending the bail mounting bolts 31 through this bar also, as shown. The front mowing units are thus so connected that they may swing in unison in a horizontal plane on the bolts 29. The rear arms 32 are extended forwardly below the beams 16, and are hinged, on horizontal axes, at 38 to connecting arms 39 which extend forwardly over the tie bar 37 and are slotted at right angles to this bar at 40 to receive pins 41. These pins 41 are secured in the tie bars, and are elongated vertically and headed as at 42, so that the arms 39 will be retained in place but with sufficient freedom of movement to permit the raising and lowering of the front mowing gang without interference.

A steering arm 43 is extended rigidly from the shaft or column 14 outwardly and forwardly over the tie bar 37, and a steering rod 44 is pivotally connected at one end 45 to the free end of this arm, while the other end 46 is hooked through an aperture 47 in the tie bar.

The foregoing arrangement is such that, by turning the wheel 10 in the normal steering operation of the tractor, the mowing units will be shifted in unison to either side in order to properly track ahead of the machine and cut an arcuate swath in the grass. As an example, in making a turn to the right, the frontal units A, B, and C will be shifted to the right by the parallel lever action of the tie bar 37 and arms 27 on the pivotal points 29. These mowing units will thus "carry around" the turn and cut the grass exactly in the proper curved path subsequently followed by the tractor. At the same time, the endwise movement of the tie bar 37 will cause a corresponding movement of the frontal ends of the arms 39 such as will shift the rear mowing units D and E to the left in order to properly cut the swaths between the frontal units, as will be readily evident. This shifting action of the mowing units is thus so co-ordinated with the steering action of the tractor that it will accommodate itself automatically to the degree at which the turn is made, and the caster action of the units will at all times assure their proper cutting angle to the grass. By manipulating the lever 22 the operator may at any time raise or lower the mowing units as may be required while traveling from one lawn or area to another, and the steering action in no way effects this lifting operation. A torsional coil spring 48 is hooked at opposite ends 49 to one bearing 17 and the upper beam 15 (around which the spring is coiled), and this spring is tensioned to act as a counterbalance against the weight of the mowing units to facilitate the raising and lowering thereof.

Each mowing unit A, B, C, D, and E is provided with a hood 50 which is positioned and arranged to receive the grass blades cut by the unit. Pipes or conduits 51 communicate with each hood 50 and lead to a cutting unit 52 which is mounted on a bracket 53 secured to the tractor frame 8. This cutting unit includes a housing 54 and a rotor 55 which is rotated rapidly by the engine 6 of the tractor through the medium of belts 56 connecting the power takeoff pulley 57 with the pulley 58 of the cutting unit. The housing rotor elements of the cutting unit have blades or hammers 59 which are so arranged that they will cut the grass blades entering the unit into very fine or minute particles, and these blades are further so arranged that they will set up a suction through the pipes 51 sufficient to draw the cut grass blades from the mowing units into the cutting unit. The effectiveness of this suction is greatly increased by the fact that it acts upon the grass immediately after it has been cut and while it is momentarily in suspension as it is thrown up into the chamber formed by the hood. Under these circumstances the grass will not have had an opportunity to settle back on the stubble where it would soon pack and become difficult to remove by suction. The housing 54 has a discharge spout 60 in its lower and rear side. The pipes 51 may either be of flexible material or, as here shown, may have slip joints 61 wherever necessary to permit the hereinbefore described movements of the mowing units without causing any breakage or disconnections of the pipes.

It will be apparent from the foregoing that the cut grass blades will be sucked up into the hoods 50, drawn through the pipes 51 to the cutting unit 53, and therein cut up into extremely small particles which are subsequently discharged onto the ground through the spout 60. The discharged particles fall onto the grass just cut by the mowing units. The fineness of the particles of grass, as thus cut up in the unit 52, makes it possible to thus discharge them back onto the lawn and makes it unnecessary to either collect or rake up the cut grass and carry it away, as has heretofore been the case, in order to prevent these large particles from killing the lawn. The finely cut particles, on the other hand, are found to readily work down around the grass roots and to actually effect a beneficial result on the grass.

It is understood that suitable modifications may be made in the structure as herein shown and described, provided that such modifications fall within the spirit and scope of the appended claims. Having thus fully disclosed my invention, what I claim as new and desire to secure by Letters Patent is:

1. In combination, a vehicle, a lawn mower carried by the vehicle for severing grass as the vehicle moves forwardly over a lawn, a chamber forming receptacle disposed adjacent the mower to directly receive the grass cut thereby and thrown into the chamber in loose momentarily suspended condition, a comminuting device tubularly connected to said receptacle and comprising a power driven cutter and blower adapted to creating a suction in said chamber, for removing the cut grass in momentary suspension therein, and for further reduction of the grass into finely cut particles for discharge upon the lawn.

2. In combination, a vehicle, a lawn mower carried by the vehicle for severing grass as the vehicle moves forwardly over a lawn, a chamber forming receptacle disposed adjacent the mower to directly receive the grass cut thereby and thrown into the chamber in loose momentarily suspended condition, a comminuting device tubularly connected to said receptacle and comprising a power driven cutter and blower adapted to creating a suction in said chamber, for removing the cut grass in momentary suspension therein, and for further reduction of the grass into finely cut particles, and means for discharging the finely cut particles upon the lawn rearwardly of the mower.

3. In a machine of the character described, a motor vehicle, a lawn mower mounted on the vehicle, a receptacle forming a chamber adjacent the mower, the mower and receptacle being so positioned that the mower will throw cut grass in loose spray-like condition into the chamber, a comminuting device mounted on the vehicle and driven by the motor thereof, a tubular connection between said device and receptacle, said device including a cutter and blower adapted to set up a suction in the tubular device to remove the cut grass from the chamber before the grass has settled and reduce it to relatively finer particles for redeposit upon the lawn.

ADOLPH RONNING.